March 13, 1951 — R. V. STAAF — 2,545,416
SUPPORT FOR LUMINOUS TUBING
Filed July 7, 1948
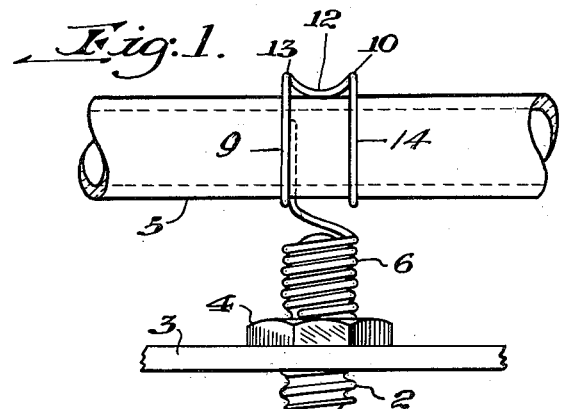
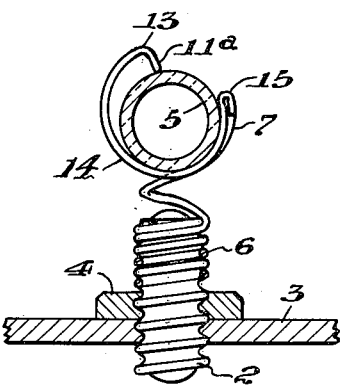
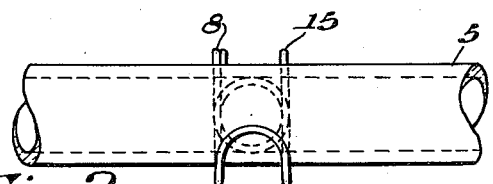
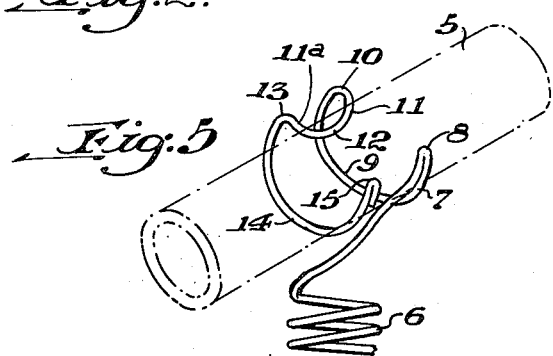
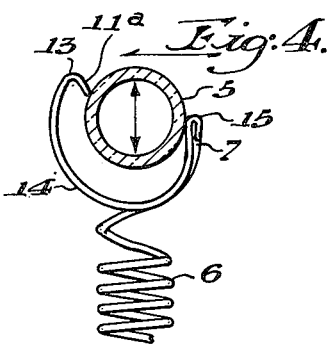
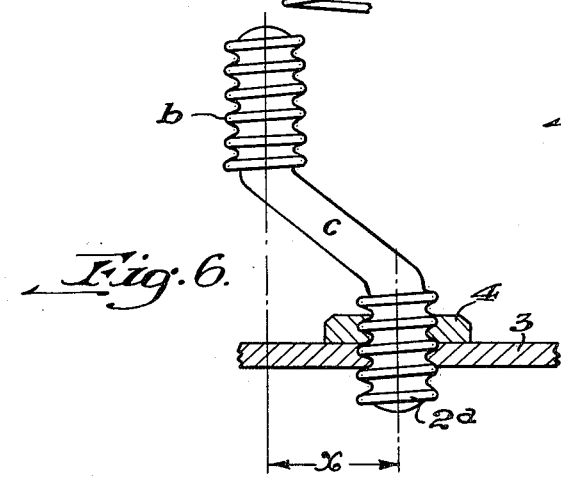
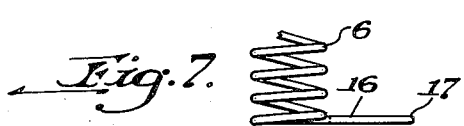
INVENTOR.
RICHARD V. STAAF.
BY C. M. Clarke
ATTORNEY.

Patented Mar. 13, 1951

2,545,416

UNITED STATES PATENT OFFICE 2,545,416

SUPPORT FOR LUMINOUS TUBING

Richard V. Staaf, Crafton, Pa., assignor, by direct and mesne assignments, of one-fourth to himself, one-fourth to Herbert B. Groetzinger, one-fourth to Richard W. Staaf, and one-fourth to Herbert W. Groetzinger, all of Pittsburgh, Pa.

Application July 7, 1948, Serial No. 37,380

2 Claims. (Cl. 248—50)

My invention relates to improvements in mounting supports for the lighting tubes of the kind commonly employed in neon signs.

Such tubes, as in the form of alphabetical letters, figures, or the like, are usually arranged in predetermined positions, outwardly beyond a supporting base, and located at a desirable distance therefrom.

The improvement is designed to be used with the usual conventional insulating supports or riser posts, whereby the tubular element consisting of the lamp casing, may be conveniently, quickly and positively, and also detachably secured thereto, in variably suitable locations outwardly beyond the supporting base.

It is designed to greatly simplify and cheapen the construction, as by elimination of the usual cradle or supporting saddle for the tube, and the improvement consists in its entirety in a properly disposed resilient single member, as of wire, for screw attachment to the post, and for efficient connection with and disconnection of the tube therefrom.

One preferred form of the invention is illustrated in the accompanying drawings, in which:

Fig. 1 is a view of the device in position for support of the tube outwardly beyond the base.

Fig. 2 is a plan view of Fig. 1.

Fig. 3 is a transverse sectional view showing the tube in supported position.

Fig. 4 is a similar view illustrating the position of the tube in engaging or disengaging position.

Fig. 5 is a perspective view of the single wire supporting and clamping formation.

Fig. 6 is a modified detail view in elevation showing a form of riser post having an offset terminal, providing for annular adjustment.

Fig. 7 is a partial detail of the base connecting coiled terminal of the post.

Fig. 8 is a plan view of the same.

Ordinarily the riser post 2 is mounted on a base 3, as a supporting plate or the like. Such riser post, of well known form, is of non-conducting material as glass, or the like, adapted to be screwed into the base 3 and there tightly held by any suitable means, as a lock nut 4.

Means for connecting and supporting the usual tube 5 outwardly beyond the base 3, comprises a single resilient wire bent to form a lower spiral form, as at 6, by which it may be adjustably connected with the post 2 in position at any desired permissible location outwardly beyond the base.

The outer portion of such wire is bent into the clip form illustrated, particularly in Fig. 5, in which a tube embracing portion 7 is doubled upon itself as at 8, terminating in a reverse bend, and then reversely curved annularly, to form one of the main U shape tube embracing members 9.

Such member 9 extends around and upwardly, approximating a part-circular formation, and is then reversed upon itself as at 10, and is bent downwardly and backwardly as at 11, then rounded in loop form as at 12, and abruptly rebent as at 13.

The wire is then continued like portion 9, in an equal part-circular formation 14, for similar spaced apart tube engagement, partly around the lower portion of the tube, then terminating in a reversed rounded end portion 15.

It will be observed that by such formation of the wire, it provides, as holding terminals, the loop 12 and the twin downwardly disposed wedge portions 11 and 11a. As thus constructed, and with proper adjustment outwardly or inwardly on the post by the spiral mounting portion 6, the device is in receiving position for insertion of the tube 5.

Such placement of the tube is by movement downwardly, against the terminals 8 and 15 at one side, and against the sloping or wedging portions 11, 11a.

Downward pressure of the tube 5 against such portions, effects their separation sufficiently for preliminary placement of the tube, as in Fig. 4, and to its final holding and clamping position of Figure 3.

Due to the clip construction, the tube may be as readily removed by simply exerting backward pressure on the terminal loop 12, thus opening the gap sufficiently far to permit its removal.

Thereupon, the resilient arms 9 and 14 will reassume their original position.

Because of the great variety of shapes, symbols, lettering, etc. in various arrangements and combinations of neon lighting tubing, it is sometimes difficult or impossible to utilize all the previously prepared post sockets in the base, for standard straight posts.

In order to compensate and provide for such conditions, with a variable range of annular adjustment of the tube-connecting portion, I show in Fig. 6 a modified form of post adapted to satisfactorily provide for such condition.

In such form the base connecting end of the post 2a is connected with the tube holding clip portion b, by an off-set connecting neck c, such end portions 2a and b being conventionally threaded, or otherwise designed, as desired for other usable connecting formation.

As indicated, the center line of terminal b is radially off-set from the center line of base connecting terminal 2a, any desired distance, as indicated at $x$. By such form, the outer connecting terminal $b$ may be rotated around its base center connection to readily locate the outer terminal for compensating placement, within a reasonably ample range.

An additional feature of assistance is shown in Figs. 7 and 8, in which the base connecting end portion of the spirally coiled wire, is provided with means for either rotation, or attachment.

In such feature, the terminal wire portion of the coil of the series 6 is extended laterally, as at 16, either singly, or preferably with a redoubled rounded terminal 17. Such formation offers opportunity for overcoming frictional resistance, either in application for tightening or in removal, or adjustment otherwise.

By the redoubled form of the wire terminal the clearance between the sides also provides for insertion through the slot 18 of a holding screw or pin, if desired.

The construction and operation of the tube holding clip will be readily understood and appreciated from the foregoing description. It is simply and cheaply made and constitutes, per se, the only necessary connection between the post terminal and the tube.

It may be made in any suitable size, and of dimensions to be adapted to varying diameters of tubes, and of post terminals, as well.

While preferably the clip is made of a single diameter and length of suitably resilient wire, and of one continuous piece, end welded sections of wire may be utilized, or other suitable strip pieces of narrow lengths of resilient metal may be used, to be bent into similar clip formation, for substantially equivalent construction and functioning.

Likewise, the clip may be used for connection with other than lighting tubes, or for any other available forms of cylindrical or polygonal shape, either hollow or solid, without departure from the scope of the following claims.

What I claim is:

1. An attachment for mounting a luminous tube on a support having externally threaded supporting members projecting therefrom comprising a wire having one terminal end coiled for threaded engagement over one of said threaded supporting members to mount the attachment in position on said support, said wire having its other terminal end formed to provide an integral clamp for resilient clamping engagement with a luminous tube to mount the tube on said support, said coiled terminal end having a clip projecting laterally therefrom for connection to said support to prevent rotation of the attachment with respect to said supporting member.

2. An attachment for mounting a luminous tube on a support having externally threaded supporting members projecting therefrom, comprising: a wire having one terminal end coiled for threaded engagement over one of said threaded supporting members to mount the attachment in position on said support, said wire having its other terminal end formed to provide an integral clamp for resilient clamping engagement with a luminous tube to mount the tube on said support, said clamp consisting of a resilient wire bent to form a pair of spaced apart U-shaped supporting portions each having at one side of an entrance and exit space a rounded end terminal, and continued reversely from said terminals to form a pair of side by side spaced apart tube engaging portions, and connected by a middle, reversely disposed loop portion at the other side of said space and opposite said rounded end terminals, said middle connecting loop being abruptly disposed backwardly and inwardly providing wedging separating contact with an inserted tube and reacting holding engagement therewith.

RICHARD V. STAAF.

REFERENCES CITED

The following references are of record in the file of this patent:

UNITED STATES PATENTS

| Number | Name | Date |
|---|---|---|
| 1,166,928 | Pierce | Jan. 4, 1916 |
| 1,861,532 | Hough | June 7, 1932 |
| 2,050,559 | Budnick | Aug. 11, 1936 |
| 2,051,480 | Hoge | Aug. 18, 1936 |
| 2,234,989 | Tkach | Mar. 18, 1941 |
| 2,352,318 | Guarnaschelli | June 27, 1944 |
| 2,394,575 | Wheeler | Feb. 12, 1946 |

FOREIGN PATENTS

| Number | Country | Date |
|---|---|---|
| 360,350 | Great Britain | Nov. 5, 1931 |